United States Patent
Ma et al.

(10) Patent No.: US 12,233,410 B2
(45) Date of Patent: Feb. 25, 2025

(54) MICROFLUIDIC CHANNEL BACKPLANE AND METHOD OF MANUFACTURING THE SAME, AND MICROFLUIDIC DETECTION CHIP

(71) Applicant: BOE TECHNOLOGY GROUP CO., LTD., Beijing (CN)

(72) Inventors: Xiaochen Ma, Beijing (CN); Ce Ning, Beijing (CN); Chao Li, Beijing (CN); Jiayu He, Beijing (CN); Xueyuan Zhou, Beijing (CN); Xiao Zhang, Beijing (CN); Xin Gu, Beijing (CN); Zhengliang Li, Beijing (CN); Guangcai Yuan, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 925 days.

(21) Appl. No.: 17/292,277

(22) PCT Filed: Jan. 23, 2020

(86) PCT No.: PCT/CN2020/073972
§ 371 (c)(1),
(2) Date: May 7, 2021

(87) PCT Pub. No.: WO2021/147072
PCT Pub. Date: Jul. 29, 2021

(65) Prior Publication Data
US 2022/0048028 A1   Feb. 17, 2022

(51) Int. Cl.
*B01L 3/00*   (2006.01)

(52) U.S. Cl.
CPC ... *B01L 3/502707* (2013.01); *B01L 3/502715* (2013.01); *B01L 3/50273* (2013.01);
(Continued)

(58) Field of Classification Search
CPC ......... B01L 3/502707; B01L 3/502715; B01L 3/50273; B01L 2200/16; B01L 2300/041;
(Continued)

(56) References Cited

U.S. PATENT DOCUMENTS

2004/0092032 A1* 5/2004 Winkler ............... B01J 19/0046
506/37
2005/0277125 A1* 12/2005 Benn ....................... B01L 3/563
435/287.2
(Continued)

FOREIGN PATENT DOCUMENTS

| CN | 101670998 A | 3/2010 |
|---|---|---|
| CN | 101765762 A | 6/2010 |

(Continued)

OTHER PUBLICATIONS

Extended European Search Report for Application No. 20891412.7 issued by the European patent Office on Dec. 19, 2022.

*Primary Examiner* — P. Kathryn Wright
*Assistant Examiner* — Curtis A Thompson
(74) *Attorney, Agent, or Firm* — IP & T GROUP LLP

(57) ABSTRACT

A microfluidic channel backplane includes a base, and a plurality of microfluidic channels, a sample-adding channel and an enrichment channel that are disposed above the base. Each microfluidic channel of the plurality of microfluidic channels includes a first end and a second end. The sample-adding channel is communicated with first ends of the plurality of microfluidic channels. The enrichment channel includes a first enrichment sub-channel and a second enrichment sub-channel. The first enrichment sub-channel is communicated with second ends of the plurality of microfluidic channels, and one end of the second enrichment sub-channel is communicated with the first enrichment sub-channel.

16 Claims, 11 Drawing Sheets

(52) U.S. Cl.
    CPC ..... *B01L 2200/16* (2013.01); *B01L 2300/041* (2013.01); *B01L 2300/0645* (2013.01); *B01L 2300/0819* (2013.01); *B01L 2300/0887* (2013.01); *B01L 2400/0415* (2013.01)

(58) Field of Classification Search
    CPC ..... B01L 2300/0645; B01L 2300/0819; B01L 2300/0887; B01L 2400/0415; G01N 15/02
    See application file for complete search history.

(56) References Cited

U.S. PATENT DOCUMENTS

| | | |
|---|---|---|
| 2007/0116594 A1 | 5/2007 | Shimizu et al. |
| 2008/0070311 A1 | 3/2008 | Li |
| 2009/0014360 A1 | 1/2009 | Toner et al. |
| 2010/0181195 A1* | 7/2010 | Garcia Tello ....... B01F 33/3031 204/600 |
| 2010/0236927 A1* | 9/2010 | Pope ................ B01L 3/502792 204/600 |
| 2018/0074039 A1* | 3/2018 | Soper ............... B01L 3/502761 |
| 2019/0160465 A1 | 5/2019 | Toner et al. |
| 2019/0351418 A1* | 11/2019 | Lv ..................... G01N 15/1023 |

FOREIGN PATENT DOCUMENTS

| | | |
|---|---|---|
| CN | 104698064 A | 6/2015 |
| CN | 108956467 A | 12/2018 |
| CN | 109682878 A | 4/2019 |
| WO | 2016154302 A1 | 9/2016 |

\* cited by examiner

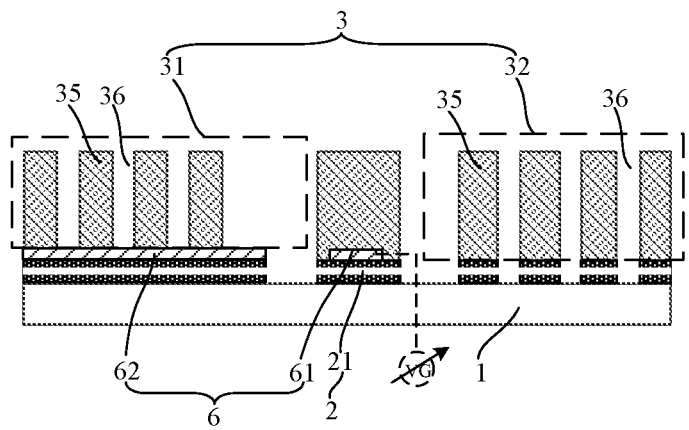

FIG. 8

| A base is provided, and a microfluidic channel film is formed on a side of the base, the microfluidic channel film is formed with a plurality of microfluidic channels therein; each microfluidic channel of the plurality of microfluidic channels includes a first end and a second end. | S1 |

↓

| A supporting film is formed on a side of the microfluidic channel film away from the substrate. | S2 |

↓

| The supporting film is patterned to form a supporting layer, and the supporting layer includes a first depression, a second depression, and a plurality of supporting columns located in the first depression and the second depression. | S3 |

↓

| The microfluidic channel film is etched downwards to form a first communication opening at a position corresponding to first ends of the plurality of microfluidic channels, so that the first ends of the plurality of microfluidic channels are communicated with the sample-adding channel, and to form a second communication opening at a position corresponding to second ends of the plurality of microfluidic channels, so that the second ends of the plurality of microfluidic channels are communicated with the first enrichment sub-channel of the enrichment channel. | S4 |

FIG. 9

MICROFLUIDIC CHANNEL BACKPLANE AND METHOD OF MANUFACTURING THE SAME, AND MICROFLUIDIC DETECTION CHIP

CROSS-REFERENCE TO RELATED APPLICATIONS

This application is a national phase entry under 35 USC 371 of International Patent Application No. PCT/CN2020/073972, filed on Jan. 23, 2020, which is incorporated herein by reference in its entirety.

TECHNICAL FIELD

The present disclosure relates to the field of microfluidic technologies, and in particular, to a microfluidic channel backplane and a method of manufacturing the same, and a microfluidic detection chip.

BACKGROUND

Microfluidic technology refers to a technology for processing or manipulating a minute amount of fluid (nanoliter (nL) to microliter (μL) in volume) by using microchannels (tens to hundreds of microns in size). A microfluidic chip is a main platform to realize the microfluidic technology. The microfluidic chip has characteristics of parallel sample collection and processing, high integration, high-throughput, high analysis speed, low power consumption, low material consumption, low pollution, etc. The microfluidic chip technology may be applied to fields such as biological genetic engineering, disease diagnosis and drug research, cell analysis, environmental monitoring and protection, health quarantine and judicial identification. In recent years, the microfluidic chip technology has been rapidly developed. The microfluidic chip is a hot spot field of current development of a miniaturized total analysis system.

SUMMARY

In one aspect, a microfluidic channel backplane is provided. The microfluidic channel backplane includes a base, and a plurality of microfluidic channels, a sample-adding channel and an enrichment channel that are disposed above the base. Each microfluidic channel of the plurality of microfluidic channels includes a first end and a second end. The sample-adding channel is communicated with first ends of the plurality of microfluidic channels. The enrichment channel includes a first enrichment sub-channel and a second enrichment sub-channel. The first enrichment sub-channel is communicated with second ends of the plurality of microfluidic channels, and one end of the second enrichment sub-channel is communicated with the first enrichment sub-channel.

In some embodiments, the sample-adding channel includes a first sample-adding sub-channel and at least two second sample-adding sub-channels. One side of the first sample-adding sub-channel is communicated with the first ends of the plurality of microfluidic channels, and another side of the first sample-adding sub-channel is communicated with one side of each second sample-adding sub-channel of the at least two second sample-adding sub-channels. A dimension of the first sample-adding sub-channel in a first direction is greater than a dimension of each second sample-adding sub-channel of the at least two second sample-adding sub-channels in the first direction. The first direction is parallel to a direction in which the plurality of microfluidic channels are arranged. The at least two second sample-adding sub-channels are spaced apart and arranged in parallel in the first direction.

In some embodiments, the at least two second sample-adding sub-channels include two second sample-adding sub-channels. The two second sample-adding sub-channels and the first sample-adding sub-channel are arranged in a U shape.

In some embodiments, the first enrichment sub-channel extends in a first direction, and the first direction is parallel to a direction in which the plurality of microfluidic channels are arranged. The second enrichment sub-channel extends in a second direction. The second direction is parallel to an extending direction of each microfluidic channel.

In some embodiments, the first enrichment sub-channel and the second enrichment sub-channel are arranged in an L shape or a T shape.

In some embodiments, the microfluidic channel backplane includes a microfluidic channel layer disposed on the base, and a supporting layer disposed on a side of the microfluidic channel layer away from the base. The plurality of microfluidic channels are disposed in the microfluidic channel layer. The supporting layer includes a first depression, a second depression, and a plurality of supporting columns located in the first depression and the second depression, and the plurality of supporting columns have gaps therebetween. The first depression and gaps between supporting columns located in the first depression constitute the sample-adding channel. The second depression and gaps between supporting columns located in the second depression constitute the enrichment channel.

In some embodiments, in the microfluidic channel layer, a first communication opening is provided on a side of the first ends of the plurality of microfluidic channels away from the second ends, and the first communication opening is configured such that the first ends of the plurality of microfluidic channels are communicated with the sample-adding channel. In the microfluidic channel layer, a second communication opening is provided on a side of the second ends of the plurality of microfluidic channels away from the first ends, and the second communication opening is configured such that the second ends of the plurality of microfluidic channels are communicated with the first enrichment sub-channel of the enrichment channel. The first communication opening and the second communication opening extend in a first direction, and the first direction is parallel to a direction in which the plurality of microfluidic channels are arranged.

In some embodiments, each microfluidic channel of the plurality of microfluidic channels is of an integrally formed structure. The microfluidic channel backplane further includes a foundation layer disposed on a side of the microfluidic channel layer proximate to the base. The foundation layer includes a plurality of grooves, and at least one groove of the plurality of grooves having at least one microfluidic channel of the plurality of microfluidic channels formed thereover.

In some embodiments, the microfluidic channel backplane further includes a bonding film layer disposed on a side of the supporting layer away from the base. The bonding film layer is configured such that the microfluidic channel backplane is bonded to a cover plate.

In some embodiments, the microfluidic channel backplane further includes a control electrode disposed at a side of the plurality of microfluidic channels proximate to or away from the base. An orthogonal projection of the control electrode on the base is at least partially overlapped with an orthogonal projection of each microfluidic channel of the plurality of microfluidic channels on the base. The control electrode is configured to transmit a control signal to control an enrichment rate of microfluid flowing through the plurality of microfluidic channels.

In some embodiments, the control electrode extends in a first direction, and the first direction is parallel to a direction in which the plurality of microfluidic channels are arranged.

In some embodiments, the microfluidic channel backplane further includes a driving electrode disposed at a side of the plurality of microfluidic channels proximate to or away from the base. An orthogonal projection of the driving electrode on the base is at least partially overlapped with an orthogonal projection of the sample-adding channel on the base. The driving electrode is configured to transmit a first driving signal to form an electric field for driving movement of microfluid.

In another aspect, a microfluidic detection chip is provided. The microfluidic channel backplane includes the microfluidic channel backplane as described in any of the above embodiments, and a cover plate arranged opposite to the microfluidic channel backplane.

In some embodiments, in a case where the sample-adding channel of the microfluidic channel backplane includes a first sample-adding sub-channel and two second sample-adding sub-channels that are arranged in a U shape, the cover plate is provided with two sample-adding openings therein, and the two sample-adding openings are communicated with the two second sample-adding sub-channels, respectively.

In some embodiments, the cover plate includes a detection channel arranged in a U shape, and the detection channel is communicated with an end, away from the first enrichment sub-channel, of the second enrichment sub-channel of the enrichment channel in the microfluidic channel backplane.

In some embodiments, the microfluidic channel backplane includes a driving electrode disposed at a side of the plurality of microfluidic channels proximate to or away from the base, and an orthogonal projection of the driving electrode on the base is at least partially overlapped with an orthogonal projection of the sample-adding channel on the base. The cover plate is provided with two detection openings therein, and the two detection openings are respectively disposed at two ends of the detection channel and are communicated with the detection channel. The two detection openings are configured to be coupled to an external detection device, so as to apply a second driving signal to microfluid flowing through the detection channel, and are configured to cooperate with the driving electrode in the microfluidic channel backplane to which a first driving signal is applied to form an electric field for driving movement of the microfluid.

In yet another aspect, a method of manufacturing a microfluidic channel backplane is provided, and the method includes: providing a base, and forming a microfluidic channel film on a side of the base, the microfluidic channel film being formed with a plurality of microfluidic channels therein, and each microfluidic channel of the plurality of microfluidic channels including a first end and a second end; forming a supporting film on a side of the microfluidic channel film away from the base; patterning the supporting film to form a supporting layer, the supporting layer including a first depression, a second depression, and a plurality of supporting columns located in the first depression and the second depression; the first depression and gaps between supporting columns located in the first depression forming a sample-adding channel, and the second depression and gaps between supporting columns located in the second depression forming an enrichment channel; the enrichment channel including a first enrichment sub-channel and a second enrichment sub-channel that are communicated with each other; and etching the microfluidic channel film downwards to form a first communication opening at a position corresponding to first ends of the plurality of microfluidic channels, so that the first ends of the plurality of microfluidic channels are communicated with the sample-adding channel, and to form a second communication opening at a position corresponding to second ends of the plurality of microfluidic channels, so that the second ends of the plurality of microfluidic channels are communicated with the first enrichment sub-channel of the enrichment channel.

In some embodiments, the manufacturing method further includes: forming a conductive film on a side of the microfluidic channel film away from the base after forming the microfluidic channel film and before forming the support film; patterning the conductive film to form a control electrode and a driving electrode. An orthogonal projection of the control electrode on the base is at least partially overlapped with an orthogonal projection of each microfluidic channel of the plurality of microfluidic channels on the base; and an orthogonal projection of the driving electrode on the base is at least partially overlapped with an orthogonal projection of the sample-adding channel on the base.

In some embodiments, forming the microfluidic channel film that is formed with the plurality of microfluidic channels therein on the side of the base, includes: forming a foundation layer including a plurality of grooves on a side of the base; and depositing a microfluidic channel film material on a side of the foundation layer away from the base to form the microfluidic channel film in which the plurality of microfluidic channels are formed, a microfluidic channel being integrally formed over each groove of the plurality of grooves during a deposition process.

BRIEF DESCRIPTION OF THE DRAWINGS

In order to describe technical solutions in the present disclosure more clearly, the accompanying drawings to be used in some embodiments of the present disclosure will be introduced briefly below. Obviously, the accompanying drawings to be described below are merely accompanying drawings of some embodiments of the present disclosure, and a person of ordinary skill in the art can obtain other drawings according to these drawings. In addition, the accompanying drawings to be described below may be regarded as schematic diagrams, and are not limitations on actual sizes of products, actual processes of methods and actual timings of signals involved in the embodiments of the present disclosure.

FIG. 8 is a sectional view of the microfluidic channel backplane in FIG. 7 taken along the A4-A4 line;

FIG. 9 is a flow diagram of a method of manufacturing a microfluidic channel backplane, in accordance with some embodiments of the present disclosure;

DETAILED DESCRIPTION

Figure 1:
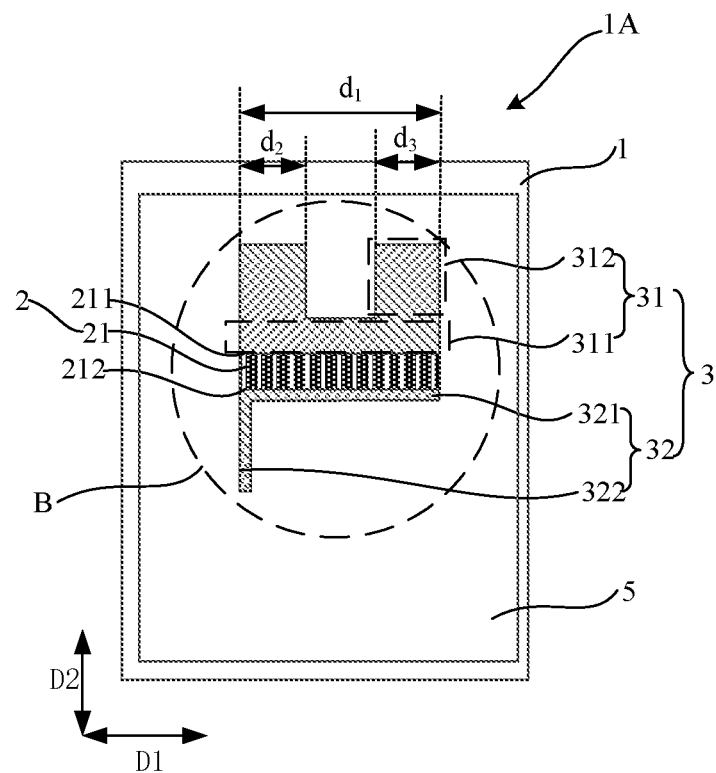
FIG. 1 is a top view of a microfluidic channel backplane, in accordance with some embodiments of the present disclosure.

Technical solutions in some embodiments of the present disclosure will be described clearly and completely with reference to the accompanying drawings. Obviously, the described embodiments are merely some but not all embodiments of the present disclosure. All other embodiments obtained on a basis of the embodiments of the present disclosure by a person of ordinary skill in the art shall be included in the protection scope of the present disclosure.

Unless the context requires otherwise, throughout the description and the claims, term "comprise" and other forms thereof such as the third-person singular form "comprises" and the present participle form "comprising" are construed as open and inclusive meaning, i.e., "including, but not limited to." In the description of the specification, terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics described herein may be included in any one or more embodiments or examples in any suitable manner.

Hereinafter, terms "first" and "second" are only used for descriptive purposes, and are not to be construed as indicating or implying the relative importance or implicitly indicating the number of indicated technical features. Thus, features defined by "first" and "second" may explicitly or implicitly include one or more of the features. In the description of the embodiments of the present disclosure, "a plurality of/the plurality of" means two or more unless otherwise specified.

In the description of some embodiments, terms "coupled", "connected" and their derivatives may be used. For example, term "connected" may be used in the description of some embodiments to indicate that two or more components are in direct physical or electric contact with each other. For another example, term "coupled" may be used in the description of some embodiments to indicate that two or more components are in direct physical or electric contact. However, term "coupled" or "communicatively coupled" may also mean that two or more components are not in direct contact with each other, but still cooperate or interact with each other. The embodiments disclosed herein are not necessarily limited to the contents herein.

The phrase "at least one of A, B and C" has a same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

Microfluidic technology may integrate basic operation units for sample reaction, separation and detection in a biological, chemical or medical analysis process into a micron-scale chip to manufacture a microfluidic detection chip. The microfluidic detection chip is used for controlling a sample to be detected, so as to realize detection of the sample to be detected.

Figure 2:
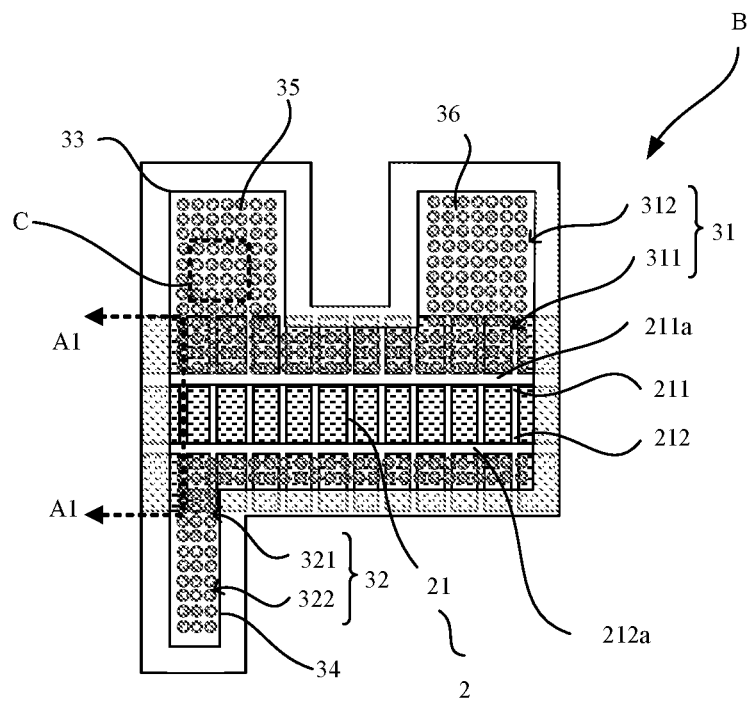
FIG. 2 is an enlarged view of the B part in FIG. 1.
Figure 17:
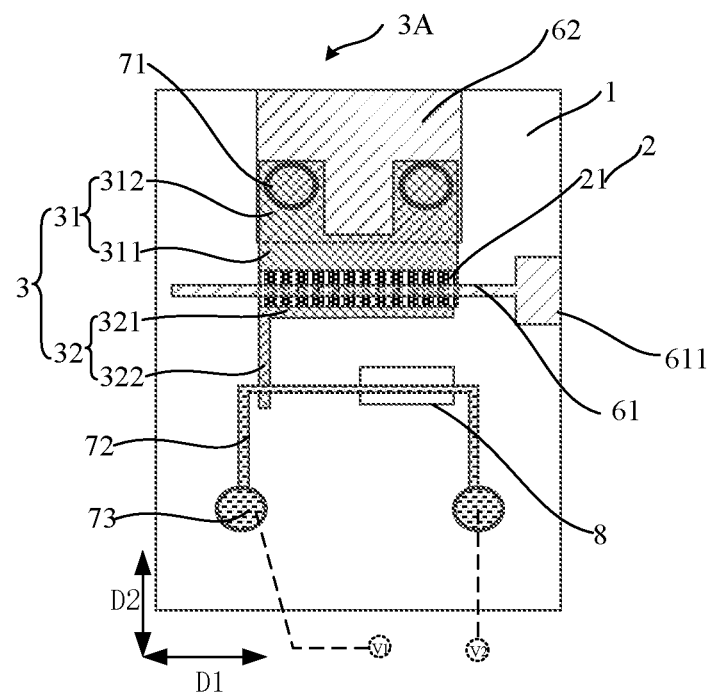
FIG. 17 is a top view of a microfluidic detection chip, in accordance with some embodiments of the present disclosure.

As shown in FIGS. 1, 2 and 17, some embodiments of the present disclosure provide a microfluidic channel backplane 1A, and a microfluidic detection chip 3A that includes the microfluidic channel backplane 1A. The microfluidic detection chip 3A may enrich a concentration of molecules to be detected in a sample to be detected before detecting the sample to be detected, so as to improve a detection precision of the sample to be detected.

It will be noted that, the sample to be detected may be a liquid substance, for example, a blood sample. The molecules to be detected in the blood sample may be, for example, hemoglobin, platelets, pathogenic cells, or the like.

Figure 3:
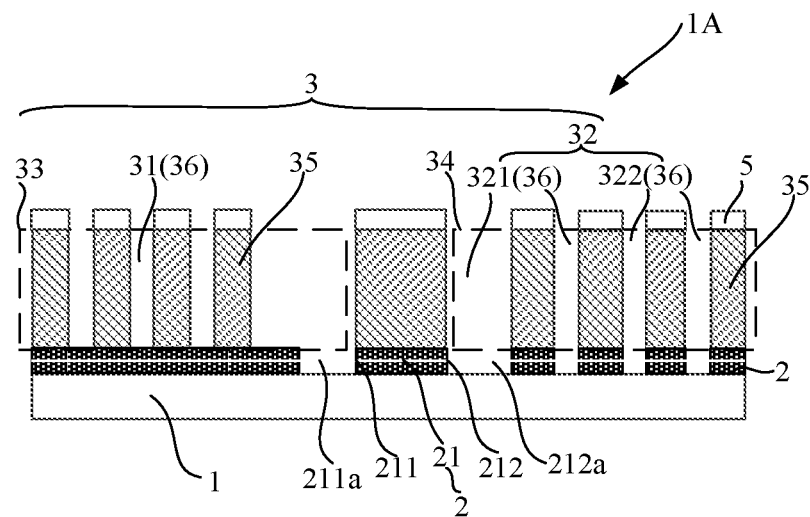
FIG. 3 is a sectional view of the microfluidic channel backplane in FIG. 2 taken along the A1-A1 line.

Referring to FIGS. 1, 2 and 3, the microfluidic channel backplane 1A includes a base 1, and a plurality of microfluidic channels 21, a sample-adding channel 31 and an enrichment channel 32 that are disposed above the base 1.

In some embodiments, the base 1 may be a glass substrate, a quartz substrate, a silicon substrate, or the like.

In some embodiments, each microfluidic channel of the plurality of microfluidic channels 21 includes a first end 211 and a second end 212. The sample-adding channel 31 is communicated with first ends 211 of the plurality of microfluidic channels 21. The enrichment channel 32 includes a first enrichment sub-channel 321 and a second enrichment sub-channel 322. The first enrichment sub-channel 321 is communicated with second ends 212 of the plurality of microfluidic channels 21. One end of the second enrichment sub-channel 322 is communicated with the first enrichment sub-channel 321.

In some examples, the plurality of microfluidic channels 21 are arranged in a row to form a microfluidic channel array. For example, as shown in FIGS. 1 and 2, the plurality of microfluidic channels 21 are arranged in parallel in a first direction D1, and each microfluidic channel 21 extends in a second direction D2. The first direction D1 and the second direction D2 intersect. For example, the first direction D1 and the second direction D2 are perpendicular to each other.

For example, each microfluidic channel 21 of the plurality of microfluidic channels 21 is a nano-scale channel. That is, a pore diameter of each microfluidic channel 21 is less than 1000 nm. For example, the pore diameter of each microfluidic channel 21 may be in a range from approximately 1 nm to approximately 50 nm, or in a range from approximately 50 nm to approximately 100 nm, or in a range from approximately 100 nm to approximately 1000 nm. In addition, when an inner wall of the microfluidic channel 21 is irregular or curved, the pore diameter may refer to a minimum pore diameter or an average pore diameter of the microfluidic channel 21.

In a case where the microfluidic channel 21 is the nano-scale channel, layers in an electric double layer at the inner wall of the microfluidic channel 21 are overlapped with each other in the channel. Substances with opposite charges or neutral substances may pass through the channel. That is, there is a charge repulsion enrichment mechanism. Therefore, the microfluidic channel 21 in the microfluidic channel backplane 1A provided in the above embodiments may realize enrichment of sample molecule concentration by utilizing the charge repulsion enrichment mechanism.

In some embodiments, as shown in FIGS. 2 and 3, the sample-adding channel 31 and the enrichment channel 32 are disposed at a side of the plurality of microfluidic channels 21 away from the base 1. The sample-adding channel 31 is communicated with the first ends 211 of the plurality of microfluidic channels 21. The sample-adding channel 31 is used in a way that a sample to be detected with a lower concentration is added into the microfluidic channel backplane 1A through it, and is used for transporting the sample to be detected with the lower concentration to the first ends 211 of the plurality of microfluidic channels 21. The enrichment channel 32 is communicated with the second ends 212 of the plurality of microfluidic channels 21, and the enrichment channel 32 is used for receiving a sample to be detected with a higher concentration obtained after enrichment through the plurality of microfluidic channels 21. Based on this, firstly, the sample-adding channel 31 of the microfluidic channel backplane 1A provided in the above embodiments is communicated with the first ends 211 of the plurality of microfluidic channels 21, and the first enrichment sub-channel 321 is communicated with the second ends 212 of the plurality of microfluidic channels 21. After the sample to be detected with the lower concentration is added into the sample-adding channel 31, based on the action of the charge repulsion enrichment mechanism, the plurality of microfluidic channels 21 have selectivity for the molecules to be detected in the sample to be detected, that is, the molecules to be detected in the sample to be detected are allowed to pass. A concentration of the molecules to be detected in the sample to be detected is lower at the first ends 211 of the plurality of microfluidic channels 21, and is increased at the second ends 212 of the plurality of microfluidic channels 21. In this way, the concentration of the sample to be detected is higher in the first enrichment sub-channel 321. Next, one end of the second enrichment sub-channel 322 of the microfluidic channel backplane 1A provided in the above embodiments is communicated with the first enrichment sub-channel 321, so that the sample to be detected with the higher concentration enriched in the first enrichment sub-channel 321 gathers in the second enrichment sub-channel 322 to be detected more easily.

In some embodiments, as shown in FIG. 1, the sample-adding channel 31 includes a first sample-adding sub-channel 311 and at least two second sample-adding sub-channels 312. One side of the first sample-adding sub-channel 311 is communicated with the first ends 211 of the plurality of microfluidic channels 21, and another side of the first sample-adding sub-channel 311 is communicated with one side of each second sample-adding sub-channel 312 of the at least two second sample-adding sub-channels 312. For example, one side of the first sample-adding sub-channel 311 is communicated with the first ends 211 of the plurality of microfluidic channels 21, and another side, opposite to the one side, of the first sample-adding sub-channel 311 is communicated with one side of each second sample-adding sub-channel 312 of the at least two second sample-adding sub-channels 312.

A dimension of the first sample-adding sub-channel 311 in the first direction D1 (referring to $d_1$ shown in FIG. 1) is greater than a dimension of each second sample-adding sub-channel 312 of the at least two second sample-adding sub-channels 312 in the first direction D1 (referring to $d_2$ and $d_3$ shown in FIG. 1). Moreover, the at least two second sample-adding sub-channels 312 are spaced apart and arranged in parallel in the first direction D1.

Based on this structure, when the sample to be detected is added into the sample-adding channel 31, the sample to be detected may be added into any one or some of the at least two second sample-adding sub-channels 312, and remaining second sample-adding sub-channel(s) are used as exhaust channel(s). In this way, bubbles may be prevented from generating in the sample to be detected, thereby avoiding blockage of the plurality of microfluidic channels 21.

For example, as shown in FIG. 1, the sample-adding channel 31 includes two second sample-adding sub-channels 312. The two second sample-adding sub-channels 312 and the first sample-adding sub-channel 311 are arranged in a U shape. When the sample to be detected is added, one second sample-adding sub-channel 312 of the two second sample-adding sub-channels 312 is used for addition of the sample to be detected, and the other second sample-adding sub-channel 312 is used as an exhaust channel.

The two sample-adding sub-channels 312 are spaced apart and arranged in parallel. The dimension of the first sample-adding sub-channel 311 in the first direction D1 is equal to $d_1$. Dimensions of the two second sample-adding sub-channel 312 in the first direction D1 are $d_2$ and $d_3$, respectively. $d_1$ is greater than $d_2$ and $d_1$ is greater than $d_3$.

Based on this structure, when the sample to be detected is added into the sample-adding channel 31, the sample to be detected may be added into one second sample-adding sub-channel 312 of the two second sample-adding sub-channels 312, and the other second sample-adding sub-channel 312 may be used as an exhaust channel. In this way, bubbles may be prevented from generating in the sample to be detected, thereby avoiding blockage of the plurality of microfluidic channels 21.

In some embodiments, as shown in FIG. 1, the first enrichment sub-channel 321 extends in the first direction D1, and the second enrichment sub-channel 322 extends in the second direction D2. The first direction D1 is parallel to a direction in which the plurality of microfluidic channels 21 are arranged, and the second direction D2 is parallel to an extending direction of each microfluidic channel 21. This facilitates communication between the first enrichment sub-channel 321 and each microfluidic channel 21. The second enrichment sub-channel 322 extends in a direction away from the first enrichment sub-channel 321 to facilitate communication between the first enrichment sub-channel 321 and a detection channel in a cover plate.

For example, as shown in FIG. 1, the first enrichment sub-channel 321 and the second enrichment sub-channel 322 are arranged in an L shape. That is, one end of the second enrichment sub-channel 322 is communicated with one end of the first enrichment sub-channel 321. The arrangement form is simple in structure and easy to realize.

For another example, the first enrichment sub-channel 321 and the second enrichment sub-channel 322 are arranged in a T shape. That is, one end of the second enrichment sub-channel 322 is communicated with a middle portion of the first enrichment sub-channel 321 (a position other than both ends of the first enrichment sub-channel 321).

It will be noted that, the above is an exemplary description of the arrangement form of the first enrichment sub-channel 321 and the second enrichment sub-channel 322, and the arrangement form of the two is not limited thereto.

Figure 7:
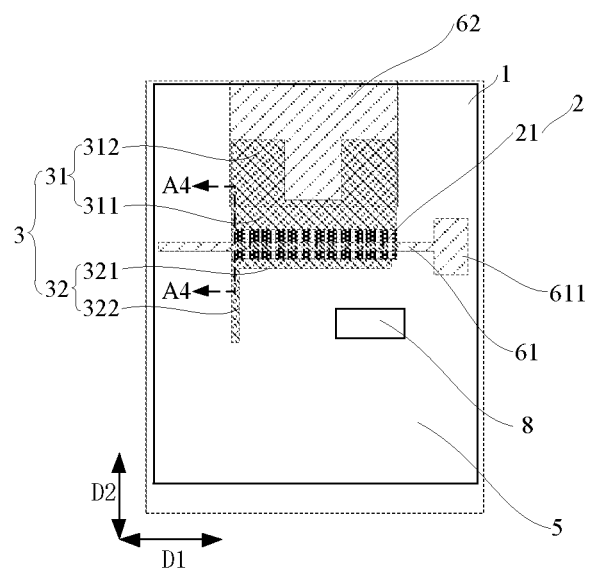
FIG. 7 is a top view of another microfluidic channel backplane, in accordance with some embodiments of the present disclosure.

In some embodiments, as shown in FIGS. 7 and 8, the microfluidic channel backplane 1A provided in embodiments of the present disclosure further includes a control electrode 61 disposed at a side of the plurality of microfluidic channels 21 proximate to or away from the base 1. An orthogonal projection of the control electrode 61 on the base 1 is at least partially overlapped with an orthogonal projection of each microfluidic channel 21 of the plurality of microfluidic channels 21 on the base 1. The control electrode 61 is configured to transmit a control signal to control an enrichment rate of microfluid flowing through the plurality of microfluidic channels 21.

For example, as shown in FIG. 8, the control electrode 61 is connected to a gate voltage VG, and an amount of charge on the plurality of microfluidic channels 21 is controlled by adjusting a magnitude of the gate voltage VG. The enrichment rate of the microfluid flowing through the plurality of microfluidic channels 21 is controlled according to a principle that unlike charges attract and like charges repel. For example, the plurality of microfluidic channels 21 have positive charges, the sample molecules to be detected have negative charges, and the enrichment rate of the sample molecules to be detected is increased by increasing the amount of charge in the plurality of microfluidic channels 21.

For example, as shown in FIG. 7, the plurality of microfluidic channels 21 are arranged in the row, a direction parallel to the direction in which the plurality of microfluidic channels 21 are arranged is the first direction D1, and the extending direction of the plurality of microfluidic channels 21 is the second direction D2. The control electrode 61 extends in the first direction D1. That is, the control electrode 61 is parallel to the direction in which the plurality of microfluidic channels 21 are arranged, and spans the plurality of microfluidic channels 21. The control electrode 61 has a signal access terminal 611, and the signal access terminal 611 is used for receiving a control signal (e.g., a voltage signal). A dimension of the signal access terminal 611 in the second direction D2 may be greater than a dimension of the other portion of the control electrode 61 in the second direction D2, which facilitates a connection between the signal access terminal 611 and an external device for providing the control signal.

In some embodiments, as shown in FIGS. 7 and 8, the microfluidic channel backplane 1A provided in the embodiments of the present disclosure further includes a driving electrode 62 disposed at a side of the plurality of microfluidic channels 21 proximate to or away from the base 1. An orthogonal projection of the driving electrode 62 on the base 1 is at least partially overlapped with an orthogonal projection of the sample-adding channel 31 on the base 1. The driving electrode 62 is configured to transmit a first driving signal to form an electric field for driving movement of microfluid.

For example, the first driving signal received by the driving electrode 62 is a first potential signal. The first potential signal is, for example, a ground potential signal or any other constant potential signal.

Materials of the control electrode 61 and the driving electrode 62 include any one of indium tin oxide, molybdenum, aluminum, copper, and other conductive materials. Of course, the materials of the control electrode 61 and the driving electrode 62 are not limited to the above materials, and are not limited herein.

The control electrode 61 and the driving electrode 62 may be made of the same material or different materials, and may be disposed in the same layer or different layers.

As shown in FIG. 7, the microfluidic channel backplane 1A provided in embodiments of the present disclosure further includes a detection unit 8. For example, the detection unit 8 is arranged proximate to the second enrichment sub-channel 322. For example, the detection unit 8 includes an optical sensor capable of converting a received optical signal into a corresponding electrical signal. In this case, the electrical signal may be analyzed to obtain a property of the sample to be detected. Of course, the detection unit 8 is not limited to an optical sensor, and it may also be other sensors, which will not be listed herein.

The above are exemplary descriptions of components or structures included in the microfluidic channel backplane 1A. Based on one or more of the above embodiments, a film structure of the microfluidic channel backplane 1A will be exemplarily described below.

As shown in FIGS. 1, 2 and 3, the microfluidic channel backplane 1A includes a microfluidic channel layer 2 disposed on the base 1, and the plurality of microfluidic channels 21 are disposed in the microfluidic channel layer 2.

Figure 5:
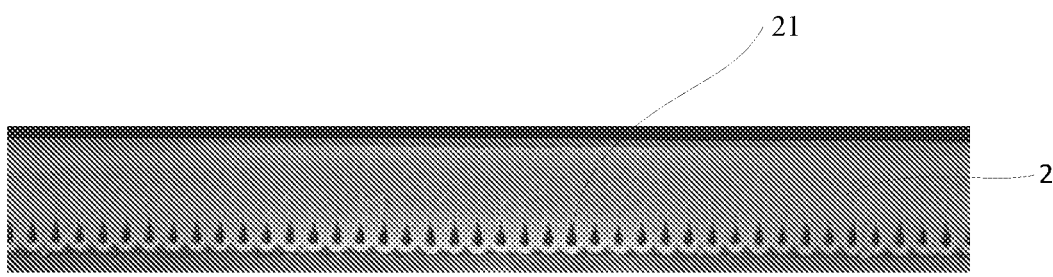
FIG. 5 is a structural diagram of microfluidic channels in a microfluidic channel backplane, in accordance with some embodiments of the present disclosure.

In some embodiments, as shown in FIG. 5, each microfluidic channel 21 of the plurality of microfluidic channels 21 is of an integrally formed structure.

Figure 4:
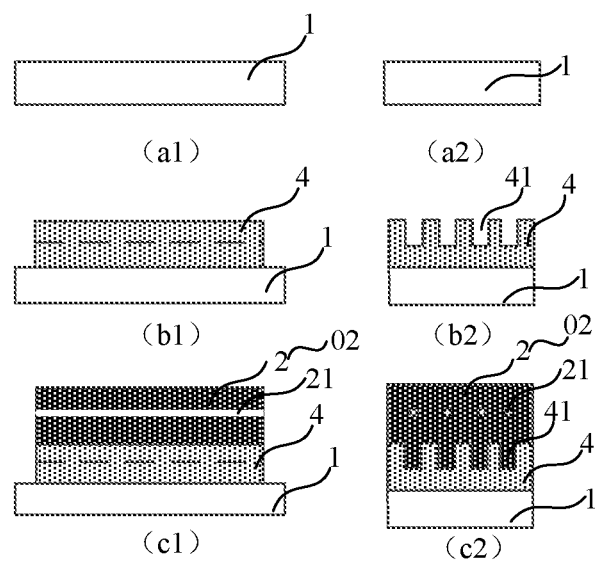
FIG. 4 is a flow diagram of manufacturing microfluidic channels in a microfluidic channel backplane, in accordance with some embodiments of the present disclosure.

For example, in order to form the microfluidic channel 21 with the integrally formed structure, as shown in parts (c1) and (c2) of FIG. 4, the microfluidic channel backplane 1A provided in embodiments of the present disclosure further includes a foundation layer 4 disposed on a side of the microfluidic channel layer 2 proximate to the base 1. The foundation layer 4 includes a plurality of grooves 41, and at least one groove 41 of the plurality of grooves 41 has at least one microfluidic channel 21 of the plurality of microfluidic channels 21 formed thereover.

For example, the foundation layer 4 may be formed through a patterning technique such as ultraviolet exposure, electron beam exposure, nano-imprinting, photolithographic stripping, etc. In addition, the foundation layer 4 may also be formed through the above patterning technique in combination with a processing technique such as dry etching, hot corrosion, etc.

For example, the plurality of microfluidic channels 21 may be obtained through a deposition process.

In the process of forming the plurality of microfluidic channels 21, a requirement for a process precision of the plurality of grooves 41 in the foundation layer 4 is low. The plurality of microfluidic channels 21 with a high process precision are formed on the foundation layer 4 with a relatively low process precision through the deposition process, so that a requirement for a patterning precision of a device is decreased.

Moreover, the microfluidic channel layer 2 is formed by natural growth through the deposition process, but not by etching. Therefore, defects caused by etching uniformity may be avoided, and there is no need to develop different etching processes for different deposition materials.

In addition, since the plurality of microfluidic channels 21 are each naturally and integrally formed during the deposition process to form closed channels, the closed channels may be formed without attaching a backplane with a cover plate, which avoids the attaching difficulty and improves the quality of the microfluidic channels.

In some embodiments, as shown in FIGS. 2 and 3, in the microfluidic channel layer 2, a first communication opening 211a is provided on a side of the first ends 211 of the plurality of microfluidic channels 21 away from the second ends 212. The first communication opening 211a is configured such that the first ends 221 of the plurality of microfluidic channels 21 are communicated with the sample-adding channel 31. That is, the sample-adding channel 31 is communicated with the first ends 221 of the plurality of microfluidic channels 21 through the first communication opening 211a.

It can be understood that, an order of magnitude of a dimension of the sample-adding channel 31 and an order of magnitude of a dimension of the first communication opening 211a are both greater than an order of magnitude of a dimension of each microfluidic channel 21 of the plurality of microfluidic channels 21. For example, the order of magnitude of the dimension of the sample-adding channel 31 and the order of magnitude of the dimension of the first communication opening 211a are both an order of micrometers (greater than 1 μm), and the order of magnitude of the dimension of each microfluidic channel 21 of the plurality of microfluidic channels 21 is an order of nanometers (less than 1 μm). The sample-adding channel 31 is communicated with the first ends 211 of the plurality of microfluidic channels 21 through the first communication opening 211a. Based on this, as long as a communication between the sample-adding channel 31 and the first communication opening 211a is realized, a communication between the sample-adding channel 31 and each microfluidic channel 21 of the plurality of microfluidic channels 21 is realized, which reduces the alignment difficulty between the sample-adding channel 31 and the plurality of microfluidic channels 21 in a communication process.

In some embodiments, as shown in FIGS. 2 and 3, in the microfluidic channel layer 2, a second communication opening 212a is provided on a side of the second ends 212 of the plurality of microfluidic channels 21 away from the first ends 211. The second communication opening 212a is configured such that the second ends 212 of the plurality of microfluidic channels 21 are communicated with the first enrichment sub-channel 321 of the enrichment channel 32. That is, the first enrichment sub-channel 321 is communicated with the second ends 212 of the plurality of microfluidic channels 21 through the second communication opening 212a.

It can be understood that, an order of magnitude of a dimension of the first enrichment sub-channel 321 and an order of magnitude of a dimension of the second communication opening 212a are both greater than the order of magnitude of the dimension of each microfluidic channel 21 of the plurality of microfluidic channels 21. For example, the order of magnitude of the dimension of the first enrichment sub-channel 321 and the order of magnitude of the dimension of the second communication opening 212a are both an order of micrometers (greater than 1 μm), and the order of magnitude of the dimension of each microfluidic channel 21 of the plurality of microfluidic channels 21 is an order of nanometers. The first enrichment sub-channel 321 is communicated with the second ends 212 of the plurality of microfluidic channels 21 through the second communication opening 212a. Based on this, as long as a communication between the first enrichment sub-channel 321 and the second communication opening 212a is realized, a communication between the first enrichment sub-channel 321 and each microfluidic channel 21 of plurality of microfluidic channels 21 is realized, which reduces the alignment difficulty between the first enrichment sub-channel 321 and the plurality of microfluidic channels 21 in a communication process.

In some embodiments, as shown in FIGS. 2 and 3, the microfluidic channel backplane 1A provided in embodiments of the present disclosure further includes a supporting layer 3 disposed on a side of the microfluidic channel layer 2 away from the base 1. When the microfluidic channel backplane 1A and a cover plate are aligned and bonded to form the microfluidic detection chip 3A, the supporting layer 3 may be used for supporting the cover plate, so as to prevent the microfluidic channel layer 2 from collapsing and damaging a structure of the plurality of microfluidic channels 21.

As shown in FIGS. 2 and 3, in the supporting layer 3, a first depression 33, a second depression 34, and a plurality of supporting columns 35 located in the first depression 33 and the second depression 34 are formed. There are gaps 36 between the plurality of supporting columns 35. The first depression 33 and gaps 36 between supporting columns 35 located in the first depression 33 form the sample-adding channel 31. The second depression 34 and gaps 36 between supporting columns 35 located in the second depression 34 form the enrichment channel 32. For example, the first depression 33 and the second depression 34 pass through the supporting layer 3 in a thickness direction of the base 1.

When the sample to be detected is added into the first depression 33, the sample to be detected moves to the first communication opening 211a through the gaps 36 between the supporting columns 35. Then, the molecules to be detected in the sample to be detected flow through the plurality of microfluidic channels 21 from the first communication opening 211a to the second communication opening 212a, during which the molecules to be detected are enriched. Then, the molecules to be detected enter the second depression 34. In this way, the supporting layer 3 may not only be used for protecting the structure of the plurality of microfluidic channels 21 and prevent the microfluidic channel layer 2 from collapsing, but also be used for forming the sample-adding channel 31 and the enrichment channel 32.

For example, the supporting columns 35 in the first depression 33 are uniformly arranged, and the supporting columns 35 in the second depression 34 are uniformly arranged.

For example, shapes of the plurality of supporting columns 35 include a cylindrical shape, a prismatic shape, a shape of a frustum of a cone, a shape of a frustum of a pyramid, or a special-shaped columnar shape. For example, as shown in FIGS. 3 and 6, the plurality of supporting columns 35 are cylindrical.

Figure 6:
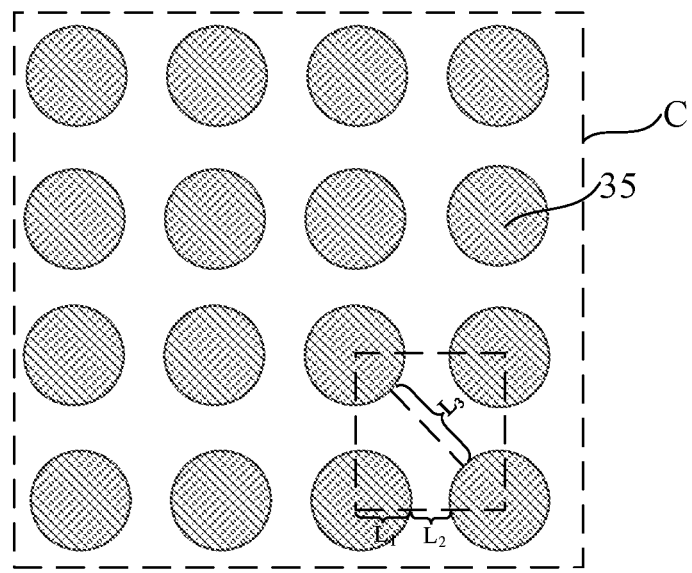
FIG. 6 is an enlarged view of the C part in FIG. 2.

For example, as shown in FIG. 6, a radius $L_1$ of each supporting column 35 of the plurality of supporting columns 35 is in a range from 4 μm to 6 μm, e.g., 5 μm. A width $L_2$ of a gap 36 between two adjacent supporting columns 35 is in a range from 3 μm to 5 μm, e.g., 4 μm. A width $L_3$ of a gap 36 between two supporting columns 35 that are located on a diagonal line in four adjacent supporting columns 35 is in a range from 9 μm to 10 μm, e.g., 9.8 μm.

As shown in FIGS. 1 and 3, in some embodiments, the microfluidic channel backplane 1A further includes a bonding film layer 5 disposed on a side, away from the base 1, of the supporting layer 3 including the plurality of supporting columns 35. The bonding film layer 5 is configured such that the microfluidic channel backplane 1A is bonded to the cover plate.

For example, the microfluidic channel backplane 1A is bonded to the cover plate by bonding molecules in the bonding film layer 5 to molecules in the cover plate. For example, a material of the bonding film layer 5 and a material of the cover plate are doped with the same metal substance, e.g., an iron-silicon alloy or a copper-silicon alloy. When the microfluidic channel backplane 1A is bonded to the cover plate, a chemical bond is formed in the iron-silicon alloy or the copper-silicon alloy to bond and encapsulate the microfluidic channel backplane 1A and the cover plate.

As shown in FIGS. 7 and 8, in some embodiments, the film structure of the microfluidic channel backplane 1A further includes an electrode layer 6 disposed at a side of the plurality of microfluidic channels 21 proximate to or away from the base 1, and the electrode layer 6 includes the control electrode 61 and the driving electrode 62.

Figure 13:
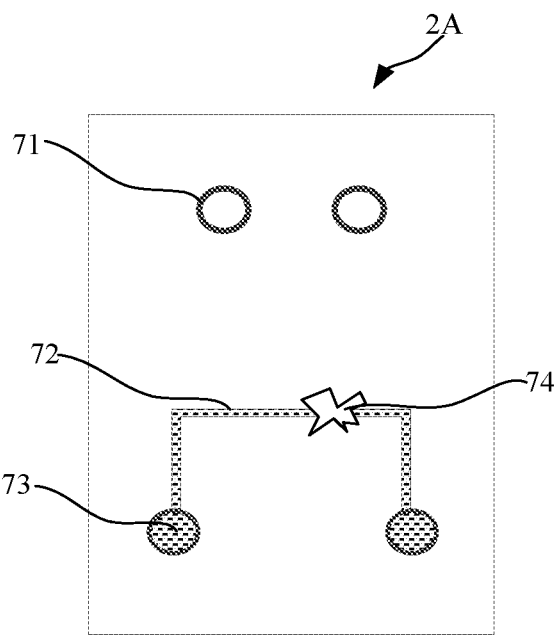
FIG. 13 is a top view of a cover plate, in accordance with some embodiments of the present disclosure.
Figure 14:
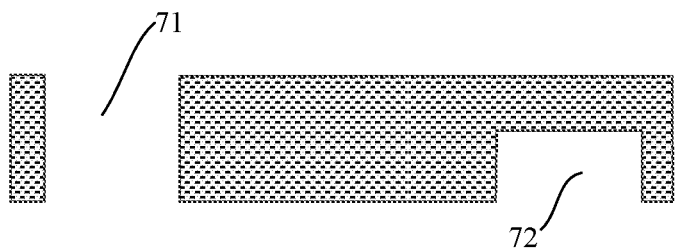
FIG. 14 is a sectional view of a cover plate, in accordance with some embodiments of the present disclosure.

As shown in FIGS. 13 and 14, embodiments of the present disclosure further provide a cover plate 2A of a microfluidic detection chip, and the cover plate 2A is provided with two sample-adding openings 71 and a detection channel 72 therein. The two sample-adding openings 71 are used for communicating with the two second sample-adding sub-channels 312 of the microfluidic channel backplane 1A, respectively. The detection channel 72 is used for communicating with an end, away from the first enrichment sub-channel 321, of the second enrichment sub-channel 322 of the enrichment channel 32 in the microfluidic channel backplane 1A. A detection reagent 74 for detecting the sample to be detected is added into the detection channel 72.

Figure 19:
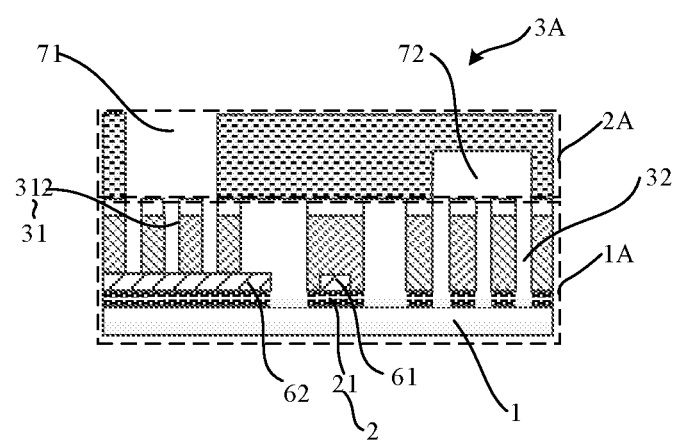
FIG. 19 is a sectional view of a microfluidic detection chip, in accordance with some embodiments of the present disclosure.

As shown in FIGS. 17 and 19, embodiments of the present disclosure further provide a microfluidic detection chip 3A, including the microfluidic channel backplane 1A as described in any of the above embodiments, and the cover plate 2A arranged opposite to the microfluidic channel backplane 1A.

Referring to FIGS. 17 and 19, in some embodiments, in a case where the sample-adding channel 31 of the microfluidic channel backplane 1A includes the first sample-adding sub-channel 311 and the two second sample-adding sub-channels 312 that are arranged in the U shape, the cover plate 2A is provided with two sample-adding openings 71 therein, and the two sample-adding openings 71 are communicated with the two second sample-adding sub-channels 312, respectively.

In some embodiments, as shown in FIGS. 17 and 19, the cover plate 2A includes the detection channel 72 arranged in a U shape. As shown in FIG. 17, the detection channel 72 is communicated with an end, away from the first enrichment sub-channel 321, of the second enrichment sub-channel 322 of the enrichment channel 32 in the microfluidic channel backplane 1A.

As shown in FIGS. 13 and 17, in some embodiments, the cover plate 2A is provided with two detection openings 73 therein, and the two detection openings 73 are respectively disposed at two ends of the detection channel 72 and are communicated with the detection channel 72.

The two detection openings 73 are configured to be coupled with an external detection device, so as to apply a second driving signal to microfluid flowing through the detection channel 72, and are configured to cooperate with the driving electrode 62 to which the first driving signal is applied in the microfluidic channel backplane to form an electrical field for driving movement of the microfluid.

Figure 18:
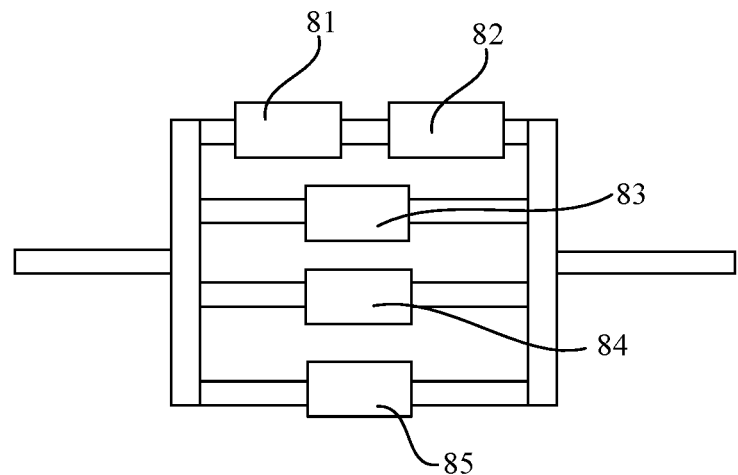
FIG. 18 is a structural diagram of a detection unit in a microfluidic detection chip, in accordance with some embodiments of the present disclosure.
Figure 20:
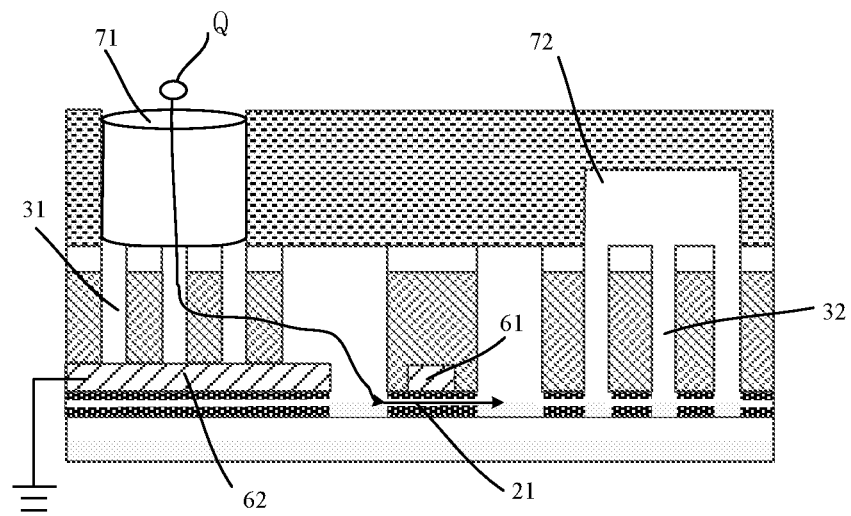
FIG. 20 is a principle diagram of droplet movement of a microfluidic detection chip, in accordance with some embodiments of the present disclosure.
Figure 21:
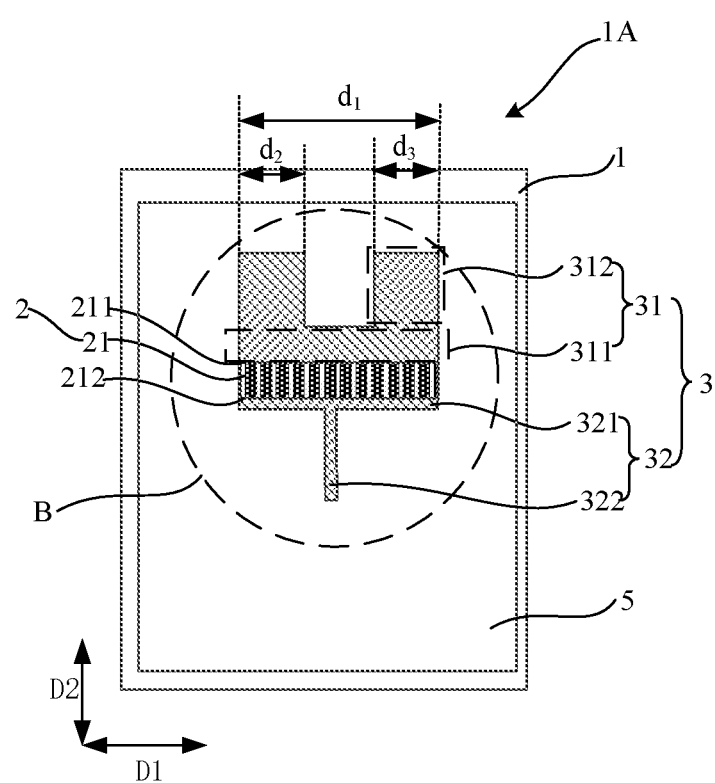
FIG. 21 is a top view of another microfluidic channel backplane, in accordance with some embodiments of the present disclosure.

As shown in FIG. 20, droplets Q of the sample to be detected are added into the sample-adding channel 31 through the sample-adding opening 71, and a specific principle that the sample molecules to be detected flowing through the plurality of microfluidic channels 21 from the sample-adding channel 31 to the enrichment channel 32 are enriched is as follows: as shown in FIG. 20, the droplets of the sample to be detected are added into the sample-adding channel 31 through the sample-adding opening 71; the first driving signal is applied to the driving electrode 62, and the driving electrode 62 transmits the first driving signal; and the two detection openings 73 are respectively coupled to a first signal terminal V1 and a second signal terminal V2 of the external detection device (as shown in FIG. 17), so as to apply the second driving signal to the microfluid flowing through the detection channel 72. Therefore, the two detection openings 73 cooperate with the driving electrode 62 to form the electrical field for driving the movement of the microfluid. Under driving of the electric field, the sample molecules to be detected flow through the plurality of microfluidic channels 21 from the sample-adding channel 31 to the enrichment channel 32, during which the sample molecules to be detected are enriched. As shown in FIGS. 17 and 18, the detection unit 8 detects the sample molecules to be detected in the enrichment channel 32.

For example, as shown in FIG. 18, the detection unit 8 may include a detection module 81 that detects different substances in the sample to be detected, e.g., a detection module 81 that detects specific detection antibodies. For example, the detection unit 8 may include a detection module 82 that sequentially detects the substances in the sample to be detected. For example, the detection unit 8 may include an optical detection module 83 that performs an optical detection on the substances in the sample to be detected. For example, the detection unit 8 may include an electrical detection module 84 that performs an electrical detection on the substances in the sample to be detected. For example, the detection unit 8 may include a detection module 85 including filtering and sifting functions.

Figure 10:
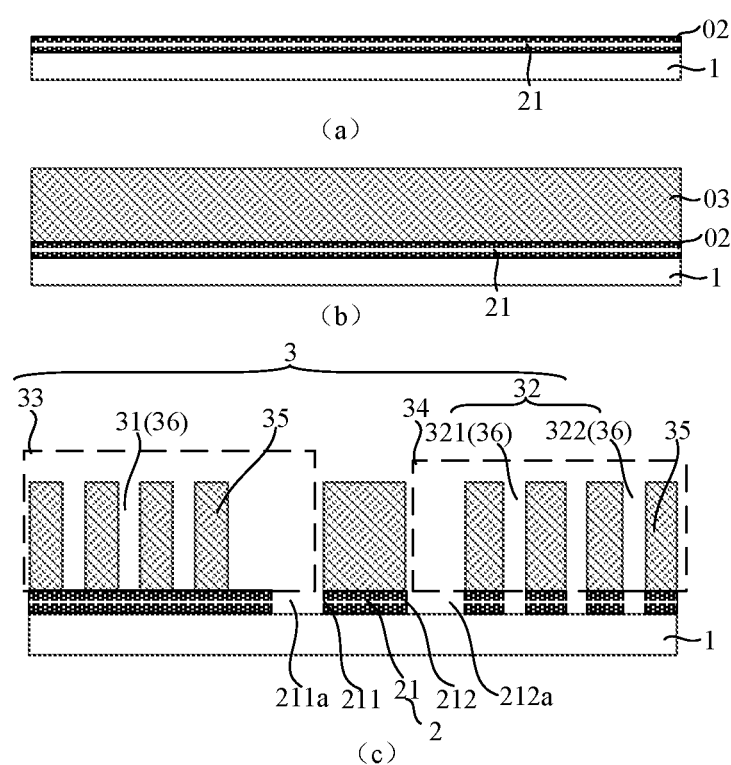
FIG. 10 is a flow diagram illustrating a process of manufacturing the microfluidic channel backplane, in accordance with some embodiments of the present disclosure.

As shown in FIGS. 9 and 10, embodiments of the present disclosure further provide a method of manufacturing a microfluidic channel backplane, and the method includes S1 to S4.

Figure 11:
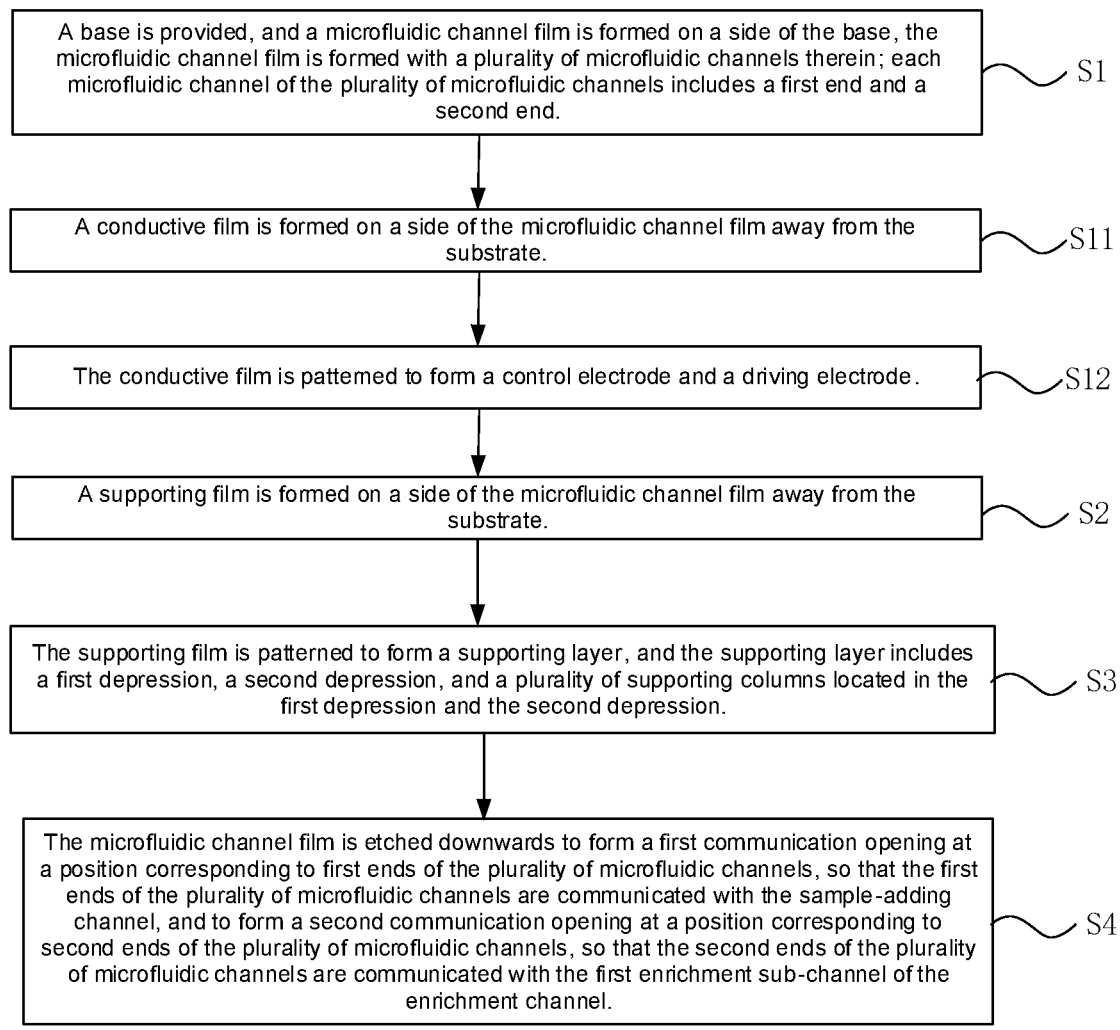
FIG. 11 is a flow diagram of a method of manufacturing another microfluidic channel backplane, in accordance with some embodiments of the present disclosure.
Figure 12:
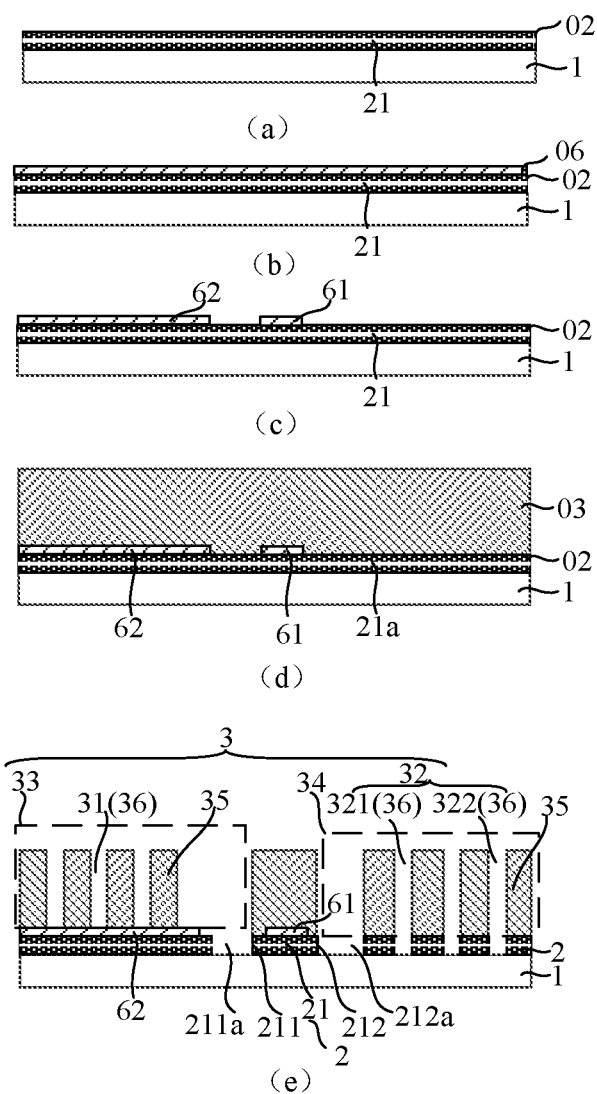
FIG. 12 is a flow diagram illustrating a process of manufacturing the other microfluidic channel backplane, in accordance with some embodiments of the present disclosure.

In S1, as shown in (a) of FIG. 10, a base 1 is provided, and a microfluidic channel film 02 is formed on a side of the base 1. The microfluidic channel film 02 is formed with a plurality of microfluidic channels 21 therein. Each microfluidic channel 21 of the plurality of microfluidic channels 21 includes a first end 211 and a second end 212. In S2, as shown in (b) of FIG. 10, a supporting film 03 is formed on a side of the microfluidic channel film 02 away from the base 1. In S3, as shown in (c) of FIG. 10, the supporting film 03 is patterned to form a supporting layer 3, and the supporting layer 3 includes a first depression 33, a second depression 34, and a plurality of supporting columns 35 located in the first depression 33 and the second depression 34. The first depression 33 and gaps 36 between supporting columns 35 located in the first depression 33 form a sample-adding channel 31. The second depression 34 and gaps 36 between supporting columns 35 located in the second depression 34 form an enrichment channel 32, and the enrichment channel 32 includes a first enrichment sub-channel 321 and a second enrichment sub-channel 322 that are communicated with each other. In S4, as shown in (c) of FIG. 10, the microfluidic channel film 02 is etched downwards to form a first communication opening 211a at a position corresponding to first ends 211 of the plurality of microfluidic channels 21, so that the first ends 211 of the plurality of microfluidic channels 21 are communicated with the sample-adding channel 31, and to form a second communication opening 212a at a position corresponding to second ends 212 of the plurality of microfluidic channels 21, so that the second ends 212 of the plurality of microfluidic channels 21 are communicated with the first enrichment sub-channel 321 of the enrichment channel 32. As shown in FIGS. 11 and 12, in some embodiments, the method of manufacturing the microfluidic channel backplane further includes S11 and S12.

In S11, as shown in (b) of FIG. 12, after the microfluidic channel film is formed in S1 and before the supporting film is formed in S2, a conductive film 06 is formed on a side of the microfluidic channel film 02 away from the base 1.

In S12, as shown in (c) of FIG. 12, the conductive film 06 is patterned to form a control electrode 61 and a driving electrode 62. As shown in FIG. 7, an orthogonal projection of the control electrode 61 on the base 1 is at least partially overlapped with an orthogonal projection of each microfluidic channel 21 of the plurality of microfluidic channels 21 on the base 1. An orthogonal projection of the driving electrode 62 on the base 1 is at least partially overlapped with an orthogonal projection of the sample-adding channel 31 on the base 1. As shown in FIG. 4, in some embodiments, forming the microfluidic channel film that is formed with the plurality of microfluidic channels 21 therein on the side of the base in S1 includes S01 and S02.

In S01, as shown in (b1) and (b2) of FIG. 4, a foundation layer 4 including a plurality of grooves is formed on a side of the base 1.

For example, a nanoimprint process is taken as an example, and a material of a foundation film layer with a specific thickness is formed on the base 1 by directly using a film forming process to obtain the foundation film layer. The material of the foundation film layer may be an inorganic material, such as silicon dioxide or silicon nitride, or a metal material, such as aluminum (Al) or molybdenum (Mo), or an organic material, such as photoresist (PR). The thickness of the foundation film layer may be approximately equal to 100 µm. Imprint adhesive is coated on the foundation film layer, then the imprint adhesive is imprinted by using an imprint template and cured, and a patterned imprint adhesive is obtained by demoulding. Then a portion of the foundation film layer that is not covered by the imprint adhesive is etched. For example, the portion of the foundation film layer that is not covered by the imprint adhesive is etched away by using a dry etching process, as shown in (b1) and (b2) of FIG. 4, so as to form the plurality of grooves 41 to obtain the foundation layer 4.

In S02, as shown in (c1) and (c2) of FIG. 4, a material of the microfluidic channel film 02 is deposited on a side of the foundation layer 4 away from the base 1 to form the microfluidic channel film 02 in which the plurality of microfluidic channels 21 are formed. During the deposition process, a microfluidic channel 21 is integrally formed over each groove 41 of the plurality of grooves 41.

For example, the material of the microfluidic channel film 02 is naturally deposited and grown through the deposition process on the foundation layer 4 formed with the plurality of grooves 41 therein. As shown in (c1) and (c2) of FIG. 4, the material of the microfluidic channel film 02 gradually adheres to the foundation layer 4 during the deposition process to form the plurality of microfluidic channels 21 over the plurality of grooves 41. For example, the deposition process may be a physical vapor deposition (PVD) process, such as a sputtering process; the deposition process may also be a chemical vapor deposition (CVD) process, such as a plasma enhanced chemical vapor deposition (PECVD) process, an atomic layer deposition (ALD) process, etc.

Figure 15:
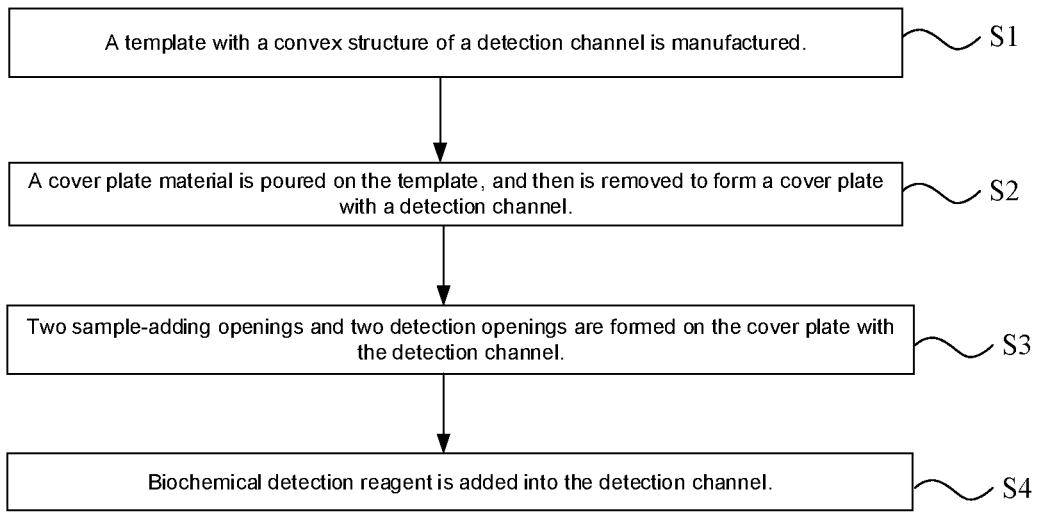
FIG. 15 is a flow diagram of a method of manufacturing a cover plate, in accordance with some embodiments of the present disclosure.
Figure 16:
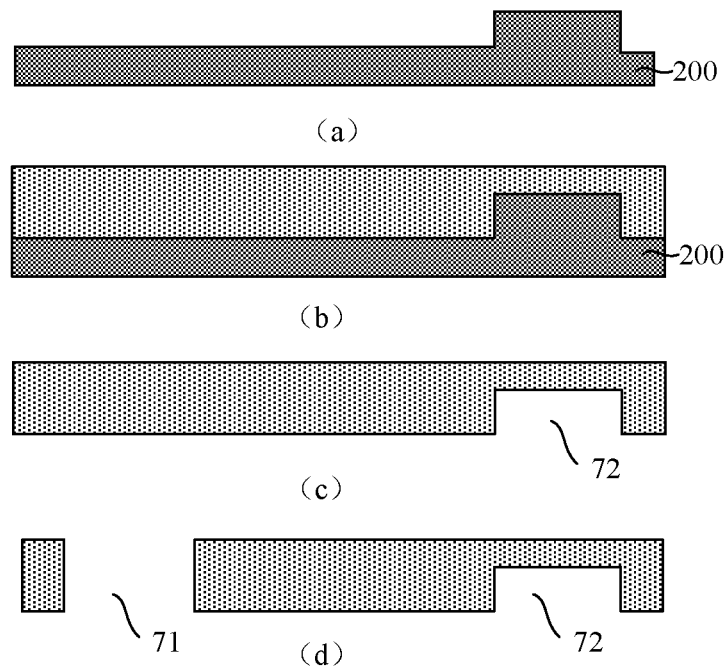
FIG. 16 is a flow diagram illustrating a process of manufacturing the cover plate, in accordance with some embodiments of the present disclosure.

As shown in FIGS. 15 and 16, embodiments of the present disclosure further provide a method of manufacturing a cover plate, and the method includes S100 to S400.

In S100, as shown in (a) of FIG. 16, a template 200 with a convex structure of a detection channel is manufactured. In S200, as shown in (b) and (c) of FIG. 16, a cover plate material is poured on the template, and then is removed to form a cover plate with a detection channel 72.

In S300, as shown in (c) and (d) of FIG. 16 and FIG. 13, two sample-adding openings 71 and two detection openings 73 are formed in the cover plate with the detection channel.

In S400, biochemical detection reagent is added into the detection channel.

Finally, the microfluidic channel backplane 1A and the cover plate 2A are bonded to form the microfluidic detection chip 3A.

The foregoing descriptions are merely some specific implementation manners of the present disclosure, but the protection scope of the present disclosure is not limited thereto, and changes or replacements that any person skilled in the art could conceive of within the technical scope disclosed by the present disclosure shall be within the protection scope of the present disclosure. Therefore, the protection scope of the present disclosure shall be subject to the protection scope of the claims.

What is claimed is:
1. A microfluidic channel backplane, comprising:
a base;
a plurality of microfluidic channels disposed above the base, each microfluidic channel of the plurality of microfluidic channels including a first end and a second end;
a sample-adding channel communicated with first ends of the plurality of microfluidic channels, the sample-adding channel being configured to add a sample to be detected into the microfluidic channel backplane; and
an enrichment channel including a first enrichment sub-channel and a second enrichment sub-channel; the first enrichment sub-channel being communicated with second ends of the plurality of microfluidic channels, and one end of the second enrichment sub-channel being communicated with the first enrichment sub-channel; the enrichment channel being configured to receive the sample to be detected obtained after enrichment through the plurality of microfluidic channels, wherein the sample-adding channel and the enrichment channel are disposed at a side of the plurality of microfluidic channels away from the base.

2. The microfluidic channel backplane according to claim 1, wherein the sample-adding channel includes a first sample-adding sub-channel and at least two second sample-adding sub-channels, wherein
one side of the first sample-adding sub-channel is communicated with the first ends of the plurality of microfluidic channels, and another side of the first sample-adding sub-channel is communicated with one side of each second sample-adding sub-channel of the at least two second sample-adding sub-channels;
a dimension of the first sample-adding sub-channel in a first direction is greater than a dimension of each second sample-adding sub-channel of the at least two second sample-adding sub-channels in the first direction; the first direction is parallel to a direction in which the plurality of microfluidic channels are arranged; and
the at least two second sample-adding sub-channels are spaced apart and arranged in parallel in the first direction.

3. The microfluidic channel backplane according to claim 2, wherein the at least two second sample-adding sub-channels include two second sample-adding sub-channels;
the two second sample-adding sub-channels and the first sample-adding sub-channel are arranged in a U shape.

4. The microfluidic channel backplane according to claim 1, wherein the first enrichment sub-channel extends in a first direction, and the first direction is parallel to a direction in which the plurality of microfluidic channels are arranged; and
the second enrichment sub-channel extends in a second direction; the second direction is parallel to an extending direction of each microfluidic channel.

5. The microfluidic channel backplane according to claim 4, wherein the first enrichment sub-channel and the second enrichment sub-channel are arranged in an L shape or a T shape.

6. The microfluidic channel backplane according to claim 1, wherein the microfluidic channel backplane comprises a microfluidic channel layer disposed above the base and a supporting layer disposed on a side of the microfluidic channel layer away from the base;
the plurality of microfluidic channels are disposed in the microfluidic channel layer;
the supporting layer includes a first depression, a second depression, and a plurality of supporting columns located in the first depression and the second depression, and the plurality of supporting columns have gaps therebetween, wherein
the first depression and gaps between supporting columns located in the first depression constitute the sample-adding channel; and
the second depression and gaps between supporting columns located in the second depression constitute the enrichment channel.

7. The microfluidic channel backplane according to claim 6, wherein
in the microfluidic channel layer, a first communication opening is provided on a side of the first ends of the plurality of microfluidic channels away from the second ends, and the first communication opening is configured such that the first ends of the plurality of microfluidic channels are communicated with the sample-adding channel;

in the microfluidic channel layer, a second communication opening is provided on a side of the second ends of the plurality of microfluidic channels away from the first ends, and the second communication opening is configured such that the second ends of the plurality of microfluidic channels are communicated with the first enrichment sub-channel of the enrichment channel; and
the first communication opening and the second communication opening extend in a first direction; the first direction is parallel to a direction in which the plurality of microfluidic channels are arranged.

8. The microfluidic channel backplane according to claim 6, wherein each microfluidic channel of the plurality of microfluidic channels is of an integrally formed structure; and
the microfluidic channel backplane further comprises:
a foundation layer disposed on a side of the microfluidic channel layer proximate to the base; the foundation layer including a plurality of grooves, and at least one groove of the plurality of grooves having at least one microfluidic channel of the plurality of microfluidic channels formed thereover.

9. The microfluidic channel backplane according to claim 6, further comprising:
a bonding film layer disposed on a side of the supporting layer away from the base;
the bonding film layer being configured such that the microfluidic channel backplane is bonded to a cover plate.

10. The microfluidic channel backplane according to claim 1, further comprising:
a control electrode disposed at a side of the plurality of microfluidic channels proximate to or away from the base, wherein
an orthogonal projection of the control electrode on the base is at least partially overlapped with an orthogonal projection of each microfluidic channel of the plurality of microfluidic channels on the base; and
the control electrode is configured to transmit a control signal to control an enrichment rate of microfluid flowing through the plurality of microfluidic channels.

11. The microfluidic channel backplane according to claim 10, wherein the control electrode extends in a first direction; and the first direction is parallel to a direction in which the plurality of microfluidic channels are arranged.

12. The microfluidic channel backplane according to claim 1, further comprising:
a driving electrode disposed at a side of the plurality of microfluidic channels proximate to or away from the base, wherein
an orthogonal projection of the driving electrode on the base is at least partially overlapped with an orthogonal projection of the sample-adding channel on the base; and
the driving electrode is configured to transmit a first driving signal to form an electric field for driving movement of microfluid.

13. A microfluidic detection chip, comprising:
the microfluidic channel backplane according to claim 1; and
a cover plate arranged opposite to the microfluidic channel backplane.

14. The microfluidic detection chip according to claim 13, wherein the sample-adding channel of the microfluidic channel backplane includes a first sample-adding sub-channel and two second sample-adding sub-channels that are arranged in a U shape, the cover plate is provided with two sample-adding openings therein, and the two sample-adding openings are communicated with the two second sample-adding sub-channels, respectively.

15. The microfluidic detection chip according to claim 13, wherein the cover plate includes a detection channel arranged in a U shape, and the detection channel is communicated with an end of the second enrichment sub-channel away from the first enrichment sub-channel.

16. The microfluidic detection chip according to claim 15, wherein the microfluidic channel backplane includes a driving electrode disposed at a side of the plurality of microfluidic channels proximate to or away from the base, and an orthogonal projection of the driving electrode on the base is at least partially overlapped with an orthogonal projection of the sample-adding channel on the base; the cover plate is provided with two detection openings therein, and the two detection openings are respectively disposed at two ends of the detection channel and are communicated with the detection channel; and the two detection openings are configured to be coupled to an external detection device, so as to apply a second driving signal to microfluid flowing through the detection channel, and are configured to cooperate with the driving electrode in the microfluidic channel backplane to which a first driving signal is applied to form an electric field for driving movement of the microfluid.

* * * * *